United States Patent
Wildon et al.

(10) Patent No.: US 10,165,052 B2
(45) Date of Patent: *Dec. 25, 2018

(54) IDENTIFICATION DEVICE, SYSTEM AND METHOD

(71) Applicant: Global Locating Systems, Ltd., Letchworth (GB)

(72) Inventors: Michael Peter Wildon, Cheauneuf de Grasse (FR); Alexander Robert Dalziel Paterson, Fayence (FR)

(73) Assignee: Global Locating Systems, Ltd. (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,060

(22) Filed: Nov. 27, 2015

(65) Prior Publication Data

US 2016/0224813 A1    Aug. 4, 2016

Related U.S. Application Data

(63) Continuation of application No. 14/687,410, filed on Apr. 15, 2015, which is a continuation of application
(Continued)

(30) Foreign Application Priority Data

May 8, 2009 (AU) .............................. 2009902061

(51) Int. Cl.
  *G08B 1/08* (2006.01)
  *H04L 29/08* (2006.01)
  (Continued)

(52) U.S. Cl.
  CPC .............. *H04L 67/12* (2013.01); *A45C 13/18* (2013.01); *A45C 13/42* (2013.01); *G01S 5/02* (2013.01);
  (Continued)

(58) Field of Classification Search
  CPC ......... A45C 13/18; A45C 13/42; G01S 19/16; G01S 5/02; G01V 15/00; G06K 19/0717;
  (Continued)

(56) References Cited

U.S. PATENT DOCUMENTS 5,576,692 A    11/1996 Tompkins
6,088,594 A *   7/2000 Kingdon ............... G01S 5/0054
                                              340/995.1

(Continued)

FOREIGN PATENT DOCUMENTS

CN    101161968 A    4/2008
DE    102005012933 B3    10/2006
EP       1607723 A1    12/2005

OTHER PUBLICATIONS

Offical Communication for U.S. Appl. No. 15/242,347 dated Jan. 27, 2017, (12 pages).
(Continued)

*Primary Examiner* — Ojiako K Nwugo
(74) *Attorney, Agent, or Firm* — John W. Branch; Lowe Graham Jones PLLC (57) ABSTRACT

An identification system includes an identification device and a communication device. The identification device is attached to an article and including a sensor. The identification device is configured to operate in a plurality of modes and configured to switch between modes of the plurality of modes based on one or more conditions of a surrounding environment sensed by the sensor. The identification device is configured to send data to a server. The communication device of a user of the identification system is configured to receive data including location data of the identification device from the server using short message service protocols or messages through a signaling channel.

22 Claims, 6 Drawing Sheets

Related U.S. Application Data

No. 13/319,413, filed as application No. PCT/AU2010/000529 on May 6, 2010, now Pat. No. 9,161,601.

(51) Int. Cl.

| | | |
|---|---|---|
| A45C 13/18 | (2006.01) | |
| A45C 13/42 | (2006.01) | |
| G01V 15/00 | (2006.01) | |
| G06K 19/07 | (2006.01) | |
| G06K 19/073 | (2006.01) | |
| H04W 4/02 | (2018.01) | |
| G06K 7/10 | (2006.01) | |
| G06Q 10/08 | (2012.01) | |
| G01S 19/16 | (2010.01) | |
| G01S 5/02 | (2010.01) | |
| H04L 12/58 | (2006.01) | |
| H04L 29/06 | (2006.01) | |
| H04W 64/00 | (2009.01) | |
| G06K 17/00 | (2006.01) | |

(52) U.S. Cl.
CPC .............. *G01S 19/16* (2013.01); *G01V 15/00* (2013.01); *G06K 7/10366* (2013.01); *G06K 19/0717* (2013.01); *G06K 19/07345* (2013.01); *G06Q 10/0833* (2013.01); *H04L 51/02* (2013.01); *H04L 67/18* (2013.01); *H04L 67/24* (2013.01); *H04L 67/26* (2013.01); *H04L 67/42* (2013.01); *H04W 4/02* (2013.01); *H04W 64/006* (2013.01); *G06K 2017/0045* (2013.01)

(58) Field of Classification Search
CPC ..... G06K 19/07345; G06K 2017/0045; G06K 7/10366; G06Q 10/0833; H04L 67/12; H04L 67/18; H04L 67/24; H04L 67/26; H04L 67/42; H04L 51/02
USPC .................................. 340/572.1–572.9, 539.1
See application file for complete search history.

(56) References Cited

U.S. PATENT DOCUMENTS

| | | |
|---|---|---|
| 6,166,652 A | 12/2000 | Benvenuti |
| 7,012,503 B2 | 3/2006 | Nielsen |
| 7,492,258 B1* | 2/2009 | Shoarinejad ......... G06Q 20/409 340/10.2 |
| 8,284,045 B2 | 10/2012 | Twitchell |
| 2002/0177476 A1 | 11/2002 | Chou |
| 2003/0048219 A1* | 3/2003 | Curatolo ............... G01S 5/0036 342/357.31 |
| 2003/0218536 A1 | 11/2003 | Linden et al. |
| 2004/0113783 A1 | 6/2004 | Yagesh |
| 2004/0183672 A1 | 9/2004 | Krishan et al. |
| 2004/0215532 A1 | 10/2004 | Boman et al. |
| 2004/0238625 A1 | 12/2004 | Walker et al. |
| 2006/0003775 A1 | 1/2006 | Bull et al. |
| 2006/0009240 A1 | 1/2006 | Katz |
| 2006/0181413 A1 | 8/2006 | Mostov |
| 2007/0222587 A1 | 9/2007 | Crider et al. |
| 2008/0055154 A1* | 3/2008 | Martucci ............... G01S 5/0027 342/357.55 |
| 2008/0133730 A1 | 6/2008 | Park et al. |
| 2010/0049635 A1* | 2/2010 | Delaney ............... G06Q 10/087 705/28 |
| 2011/0012731 A1 | 1/2011 | Stevens |
| 2011/0102172 A1* | 5/2011 | Chiu .................... G06Q 10/109 340/539.11 |
| 2012/0161958 A1 | 6/2012 | Turon et al. |
| 2015/0262463 A1* | 9/2015 | Piccoli ................ E05B 73/0017 340/572.8 |
| 2016/0379179 A1* | 12/2016 | Roisen ................... G06Q 10/30 705/308 |

OTHER PUBLICATIONS

Official Communication for U.S. Appl. No. 14/687,410 dated Sep. 21, 2016 (pp. 1-15).
Official Communication for EPO for EP Application 10771906.4-1811 dated Jul. 14, 2015, (19 pages).
Supplementary Search Report for EP Application 10771906.4-1811 dated Apr. 2, 2014, (17 pages).
International Search Report and Written Opinion for Application PCT/AU2010/000529 dated Jul. 30, 2010, (7 pages).
Official Communication for U.S. Appl. No. 13/319,413 dated Nov. 23, 2012, (19 pages).
Official Communication for U.S. Appl. No. 13/319,413 dated Sep. 6, 2013, (18 pages).
Official Communication for U.S. Appl. No. 13/319,413 dated Jun. 10, 2014, (19 pages).
Official Communication for U.S. Appl. No. 13/319,413 dated Jan. 15, 2015, (5 pages).
Official Communication for U.S. Appl. No. 13/319,413 dated Aug. 5, 2015, (5 pages).

* cited by examiner

IDENTIFICATION DEVICE, SYSTEM AND METHOD

CROSS-REFERENCE TO RELATED APPLICATIONS

This application is a continuation of U.S. application Ser. No. 14/687,410, filed Apr. 15, 2015 and claims priority to U.S. application Ser. No. 13/319,413, filed Nov. 8, 2011, International Application No. PCT/AU2010/000529, filed May 6, 2010, and to Australian Patent Application No. 2009902061, filed May 8, 2009, the entire content of each of which is incorporated into the present application by reference.

FIELD OF THE INVENTION

The present invention relates to a device, system and method for identifying a property of an article.

The property may relate to the position of an article to enable the tracking and/or location of the article, particularly, although not exclusively, for the tracking and locating of luggage and other articles in transit.

This can occur when travelling by plane, train or boat or any situations were articles such as items or luggage is transported from one destination to another. However, the invention can be seen to be tracking any article, item or object, and identifying properties of articles other than, or additional to, position.

Throughout the specification, unless the context requires otherwise, the word "comprise" or variations such as "comprises" or "comprising", will be understood to imply the inclusion of a stated integer or group of integers but not the exclusion of any other integer or group of integers.

Furthermore, throughout the specification, unless the context requires otherwise, the word "include" or variations such as "includes" or "including", will be understood to imply the inclusion of a stated integer or group of integers but not the exclusion of any other integer or group of integers.

BACKGROUND OF THE INVENTION

Each document, reference, patent application or patent cited in this text is expressly incorporated herein in their entirety by reference, which means that it should be read and considered by the reader as part of this text. That the document, reference, patent application, or patent cited in this text is not repeated in this text is merely for reasons of conciseness.

The following discussion of the background to the invention is intended to facilitate an understanding of the present invention only. It should be appreciated that the discussion is not an acknowledgment or admission that any of the material referred to was published, known or part of the common general knowledge of the person skilled in the art in any jurisdiction as at the priority date of the invention.

When travelling by airplane for example, a traveler's luggage is susceptible to being misplaced or lost by the airline baggage handlers. Retrieval of baggage can be troublesome and take days, weeks, even months and in some cases the luggage may never be found at all. This can be very stressful for the person travelling, and sometimes items within the luggage cannot be replaced, or are extremely valuable.

Tracking and locating systems and devices for articles exist. Some systems and devices initiate tracking when a tracking sensor is set off by movement and are therefore limited to having some form of movement to initiate the tracking. Other tracking devices are too large/heavy—preventing them from use with smaller items. Also many of the devices used require lots of power as they are constantly emitting signals, again making them impractical in real life situations were extended battery life is a necessity.

Systems and methods have been disclosed to facilitate the tracking of items with the use of radio frequency identification (RFID). However these are only applicable when monitoring items over a limited radius, and are susceptible to electromagnetic interference.

SUMMARY OF THE INVENTION

One aspect of the present invention includes an identification system including an identification device and a communication device. The identification device is attached to an article and including a sensor. The identification device is configured to operate in a plurality of modes and configured to switch between modes of the plurality of modes based on one or more conditions of a surrounding environment sensed by the sensor. The identification device is configured to send data to a server. The communication device of a user of the identification system is configured to receive data including location data of the identification device from the server using short message service protocols or messages through a signaling channel.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION OF THE PREFERRED EMBODIMENTS

The present invention seeks to overcome, or at least ameliorate, one or more of the deficiencies of the prior art mentioned above, or to provide the consumer with a useful or commercial choice.

Advantages of the present invention will become apparent from the following description, taken in connection with the accompanying drawings, wherein, by way of illustration and example, a preferred embodiment of the present invention is disclosed.

In accordance with a first broad aspect of the present invention, there is provided an identification system for identifying the position of an article, the identification system comprising an identification device attached to the article and a central server system arranged for data communication with the identification device, the central server system being arranged to receive a data communication from the identification device, the data communication including position identification data, the central server system being operable to determine the location of the article from the position identification data and to generate location data for transmission to a communication device of a user of the position identification system.

Preferably, the data communication further comprises article property data and the central server system is further operable to transmit the article property data to the communication device.

Preferably, the identification device is securely attached to the article, and may be permanently attached or integral/integrated with the article.

Preferably, the central server system is operable to generate a location request signal in response to a request for the location of the article and to transmit the location request signal to the identification device, the identification device being operable in response to the received location request signal to generate position identification data for transmission to the central server system.

Alternatively, the identification device is operable to generate position identification data upon request from the central server system and/or automatically upon an event, which may be prescribed, such as removal from an aircraft baggage hold.

Alternatively, the identification device is operable to generate position identification data after a predetermined period of time after initiation of the identification device.

Preferably, the identification system comprises a storage medium operably coupled to the central server system so that the central server system can access data stored/programmed therein. Preferably, the data stored in the storage medium relates to a desired location of the article, and the central server system is operable to compare the determined location of the article with the desired location of the article and, if they are different, to transmit the determined location data to the communication device of the user. It may also activate an alarm or alert indicator on the position identification device, such as illuminating a "lost bag" indicator provided thereon.

Preferably, the storage medium comprises a database.

Preferably, the location data is automatically transmitted.

Preferably, the central server system is operable to receive article identification data from the communication device of the user of the identification system, the central server system being operable to transmit the article identification data to the identification device.

Preferably, the identification device includes a display and is operable to display the article identification data via the display.

Preferably, the identification device is a cellular radio telephone network communications device, and the position identification data is determined from the cellular radio telephone network. Preferably, the cellular radio telephone network is a GSM, CDMA or 3G/3.5G/4G (WiMAX/LTE) network and the position identification data is a local area identifier for the area in which the position identification device is located.

Preferably, the identification device is operable to determine the position identification data based on strongest received signal strength indication (RSSI). This may be the closest base transceiver station (BTS) station to the location of the position identification device, such as at an airport.

Preferably, the identification device is operable to determine the position identification data based on one or more positioning methods, including: triangulation methods; hybrid methods (including Assisted GPS); Time Difference of Arrival (TOA) methods; and/or Angle of Arrival (AoA) methods.

Preferably, the central server system includes a database for storing data on local area identifiers (IDs), cell IDs, and corresponding location information, and the central server system is operable to determine the location information from or on the basis of the IDs (also referred to as reverse geo-coding). The central server system database may also store data relating to the position identification device and users associated thereto.

Preferably, the data communication between the central server system and the identification device uses short message service protocols or messages through an SS7 (Signaling System 7) signaling channel of an operator network.

Preferably, the location data is transmitted to the communication device of the user according to short message service protocols. Alternatively, the location data is transmitted via, email, or dynamic map pin-pointing using a Geographic Information System (GIS), or Interactive Voice Response (IVR). The user can also be informed of the article location through other internet communication means which may include accessing a secure website providing the location information and accessing information, for example, or software such as a dedicated custom built application provided on the communication device of the user, which may include a personal, laptop, notebook or tablet computer, or a smartphone, for example.

In accordance with a second broad aspect of the present invention, there is provided an identification device attached to an article and for use with an identification system including a central server system arranged for data communication with the identification device, and being arranged to receive a data communication from the identification device, the data communication including position identification data, the central server system being operable to determine the location of the article from the position identification data and to generate location data for transmission to a communication device of a user of the position identification system.

Preferably, the data communication further comprises article property data and the central server system is further operable to transmit the article property data to the communication device.

Preferably, the identification device is securely attached to the article, and may be permanently attached or integral/integrated with the article.

Preferably, the identification device is operable in response to a received location request signal from the central server system to generate position identification data for transmission to the central server system. Alternatively, the identification device is operable to generate position identification data after a predetermined period of time after initiation of the identification device.

Preferably, the identification device includes a display and is operable to display the article identification data on the display.

Preferably, the identification device is a cellular radio telephone network communications device, and the position identification data is determined from the cellular radio telephone network. Preferably, the cellular radio telephone network is a GSM, CDMA or 3G/3.5G/4G (WiMAX/LTE) network and the position identification data is a local area identifier for the area in which the identification device is located.

Preferably, the identification device uses short message service protocols or messages through the SS7 signaling channel of an operator network to transmit and receive data to and from the central server system.

Preferably, the identification device includes alert means for indicating the status of the position identification device.

Preferably, the identification device operates in a first mode in which the device is operable to receive and transmit data and a second mode in which the device is disabled from receiving and transmitting data.

Preferably, the identification device operates in a first mode in which the device is operable to receive and transmit radio data (Normal Functionality Mode), a second mode in which the identification device is disabled from receiving and transmitting radio data (Minimal or Minimum Functionality Mode), and a third mode (Alert Mode) in which the activated identification device displays user details on a display (such as a liquid crystal display or E-paper screen) and activates an alert indicator on the identification device, such as illuminating an alert light emitting diode (LED) indicator, and/or flashing a message on the LCD or E-paper screen provided thereon, and/or activating a sound emitting device. The identification device may operate in a fourth mode (Flight or Travel Mode) in which it can be set to operate in the hereinbefore described Minimal Functionality Mode for a period of time. The period of time may be predetermined or prescribed and set by a user or operator.

Preferably, the identification device includes one or more sensors operable to sense data relating to the identification device, the article, and/or the identification system and is operable to initiate an action on the basis of the sensed data.

Preferably, the one or more sensors include: a temperature sensor; a light sensor; a pressure sensor; a proximity sensor; and/or a motion sensor. Preferably, the motion sensor is operable to determine whether the identification device is moving on the basis of received radio frequency signal strength or cellular identification fluctuations.

Preferably, the initiated action comprises communicating the sensed data in the data communication.

Preferably, the initiated action comprises processing the sensed data and, on the basis of the processing, switching the mode of operation of the identification device.

Preferably, a sensor of the one or more sensors is operable to detect when the identification device is required to be in the second mode, the identification device being operable to switch to the second mode in response to a signal from the sensor indicating that the identification device is required to be disabled.

In accordance with a third broad aspect of the present invention, there is provided a method for identifying the position of an article using an identification device attached to the article, the method comprising the steps of receiving position identification data from the identification device and determining the position of the article from the position identification data.

Preferably, the method further comprises receiving article property data.

Preferably, the method comprises the steps of generating a location request signal in response to a request for the location of the article from a user, transmitting the location request signal to the identification device, and generating position identification data in response to the received location request signal.

Alternatively, the method comprises the step of generating position identification data after a predetermined period of time.

Preferably, the method comprises the further step of receiving article identification data from a user, and transmitting the article identification data to the identification device.

Preferably, the method comprises the step of displaying the article identification data on the identification device.

Preferably, the method uses a cellular radio telephone network communications device, and the position identification data is determined from the cellular radio telephone network. Preferably, the cellular radio telephone network is a GSM, CDMA or 3G/3.5G/4G (WiMAX/LTE) network and the position identification data is a local area identifier for the area in which the identification device is located.

Preferably, the method comprises the step of storing data on local area identifiers (IDs) and/or cell IDs in a database along with corresponding location information, and determining the location information from the local area identifier.

Preferably, the method uses short message service protocols or messages through the SS7 signaling channel of an operator network.

Preferably, the location data is transmitted to the user according to short message service protocols. Alternatively, the location data is transmitted via email or IVR. The user can also be informed of the article location through other internet communication means which may include accessing a secure website providing the information, for example.

Preferably, the method comprises sensing data relating to the identification device and/or the article and initiating an action on the basis of the sensed data.

Preferably, the sensed data includes: temperature data; visible light data; pressure data; proximity data; and/or a motion data. Preferably, the method comprises determining whether the identification device is moving on the basis of received radio frequency signal strength or cellular identification fluctuations.

Preferably, the initiated action comprises communicating the sensed data in the data communication.

Preferably, the initiated action comprises processing the sensed data and, on the basis of the processing, switching a mode of operation of the identification device.

In accordance with a fourth broad aspect of the present invention, there is provided a lock comprising a processor arranged to receive a data communication, and a first engagement means releasably engageable with a second engagement means, the processor being operable, upon receipt of the data communication, to disengage and/or engage the first engagement means and the second engagement means.

Preferably, the data communication uses short message service protocols.

Preferably, the identification system in accordance with the first aspect of the present invention as hereinbefore described, the identification device in accordance with the second aspect of the present invention as hereinbefore described, and/or the method for identifying the position of an article using an identification device attached to the article in accordance with the third aspect of the present invention as hereinbefore described, comprise a lock in accordance with the fourth aspect of the present invention as hereinbefore described.

In accordance with a fifth broad aspect of the present invention, there is provided a computer-readable storage medium on which is stored instructions that, when executed by a computer, cause the computer to perform the method for identifying the position of an article using an identification device attached to the article according to the third broad aspect of the present invention as hereinbefore described.

In accordance with a sixth broad aspect of the present invention, there is provided a computer programmed to carry out the method for identifying the position of an article using an identification device attached to the article according to the third broad aspect of the present invention as hereinbefore described.

In accordance with a seventh broad aspect of the present invention, there is provided an identification system for identifying the position of an article, the system comprising a computer processor and a storage medium, the storage medium having a software application stored thereon, whereby the processor is operable, under control of the application software, to: receive a data communication from an identification device attached to the article, the data communication including position identification data; process the position identification data to determine the location of the article; generate location data specifying the determined location; and transmit the generated location data.

In accordance with an eighth broad aspect of the present invention, there is provided an identification system for identifying a property of an article, the system comprising a computer processor and a storage medium, the storage medium having a software application stored thereon, whereby the processor is operable, under control of the application software, to: receive a data communication from an identification device attached to the article, the data communication including property identification data; process the property identification data to determine the property of the article; generate property data specifying the determined property; and transmit the generated property data.

Preferably, the property comprises a position or location, temperature, pressure, proximity, and/or motion of the article.

Preferably, the identification device includes one or more sensors operable to sense data relating to the identification device, the article, and/or the identification system and is operable to initiate an action on the basis of the sensed data.

Preferably, the one or more sensors include: a position sensor, a temperature sensor; a light sensor; a pressure sensor; a proximity sensor; and/or a motion sensor.

Preferably, the initiated action comprises communicating the sensed data in the data communication.

Preferably, the initiated action comprises processing the sensed data and, on the basis of the processing, switching a mode of operation of the identification device.

In accordance with a ninth broad aspect of the present invention, there is provided a method for identifying a property of an article using an identification device attached to the article, the method comprising the steps of receiving property identification data from the identification device and determining the property of the article from the property identification data.

In accordance with a tenth broad aspect of the present invention, there is provided an identification device attached to an article and for use with an identification system including a central server system arranged for data communication with the identification device, and being arranged to receive a data communication from the identification device, the data communication including property identification data, the central server system being operable to determine the property of the article from the property identification data and to generate property data for transmission to a communication device of a user of the property identification system.

In accordance with an eleventh broad aspect of the present invention, there is provided an identification system for identifying a property of an article, the identification system comprising an identification device attached to the article and a central server system arranged for data communication with the identification device, the central server system being arranged to receive a data communication from the identification device, the data communication including property identification data, the central server system being operable to determine the property of the article from the property identification data and to generate property data for transmission to a communication device of a user of the property identification system.

In accordance with a twelfth broad aspect of the present invention, there is provided a data communication used in the identification system in accordance with the first, seventh, eighth or eleventh aspects of the present invention as hereinbefore described.

In accordance with a thirteenth broad aspect of the present invention, there is provided a data communication used in the method for identifying the position of an article using an identification device attached to the article in accordance with the third aspect of the present invention as hereinbefore described.

In accordance with a fourteenth broad aspect of the present invention, there is provided a data communication used in the method for identifying a property of an article using an identification device attached to the article in accordance with the ninth aspect of the present invention as hereinbefore described.

In accordance with a fifteenth broad aspect of the present invention, there is provided a computer-readable storage medium on which is stored instructions that, when executed by a computer, cause the computer to perform the method for identifying a property of an article using an identification device attached to the article according to the ninth broad aspect of the present invention as hereinbefore described.

In accordance with a sixteenth broad aspect of the present invention, there is provided a computer programmed to carry out the method for identifying a property of an article using an identification device attached to the article according to the ninth broad aspect of the present invention as hereinbefore described.

Embodiments of the present invention provide an advantage over known systems and devices in that they may alert the user to the location of an article when it has not arrived at its intended destination. Alternatively, the tagged article's location may be requested by the user at any time other than when the article is in transit in an airplane so as to comply with international regulation of GSM usage on aircraft. In such instances, the position identification device will go into a standby or minimum functionality mode preventing interference with navigation devices. Furthermore, embodiments of the present invention may enable the owner of the article to direct updates of the position of the article directly to their phone or email without the need for third party tracking. A further advantage is that embodiments of the invention may reduce the time and cost associated with the location and retrieval of lost baggage. The data from the location positioning device can be shared with airlines or airline service companies to assist location of the missing articles at airports, for example, or other relevant authorities as appropriate.

The embodiment of the identification system of the invention herein described particularly relates to identifying a property of an article comprising its position or location. It should be appreciated that the invention is not to be construed as being limited to this property, and alternative embodiments of the invention may relate to identifying properties of an article other than, or additional to, position and location, including, for example, temperature, visible light or other environmental conditions, proximity, pressure, or motion/movement, or a combination of properties.

Figure 1:
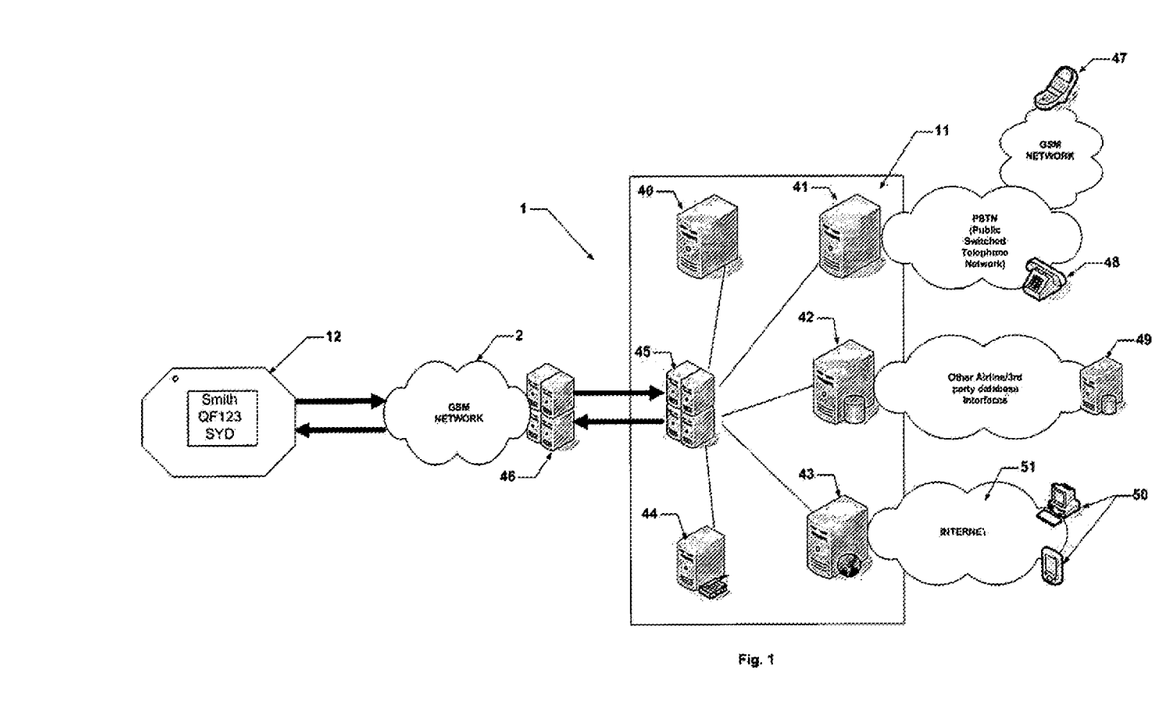
FIG. 1 is a schematic view of a position identification system in accordance with an embodiment of the present invention.

A position identification system 1 in accordance with the embodiment of the present invention comprises a position identification device in the form of a tag 12 which can be securely attached to or incorporated in an article 10. For example, the tag 12 can be securely and releasably attachable to an article 10 in the same way as a luggage label, or can be incorporated into the article 10, for example, in a handle or part of the article housing as appropriate.

The tag 12 includes GSM (Group System for Mobiles), CDMA (Code Division Multiple Access) and OFDM (Orthogonal Frequency Division Multiplexing) functionality in the form of a GSM/3G/3.5G/4G (WiMAX/LTE) modem which enables the tag 12 to communicate with a central server system 11 of the position identification system 1 via a GSM/3G/3.5G/4G (WiMAX/LTE) or CDMA cellular radio telephone network 2. Cellular radio telephone networks and the GSM/3G/3.5G/4G (WiMAX/LTE) and CDMA communications protocols are well known to persons skilled in the art and need not be described in any further detail herein except as is relevant to the present invention.

In the embodiment described herein, the tag 12 is intended to be used by a person travelling to locate the position and potentially track the movement of an article 10 such as a piece of luggage that may be lost in transit.

Figure 2A:
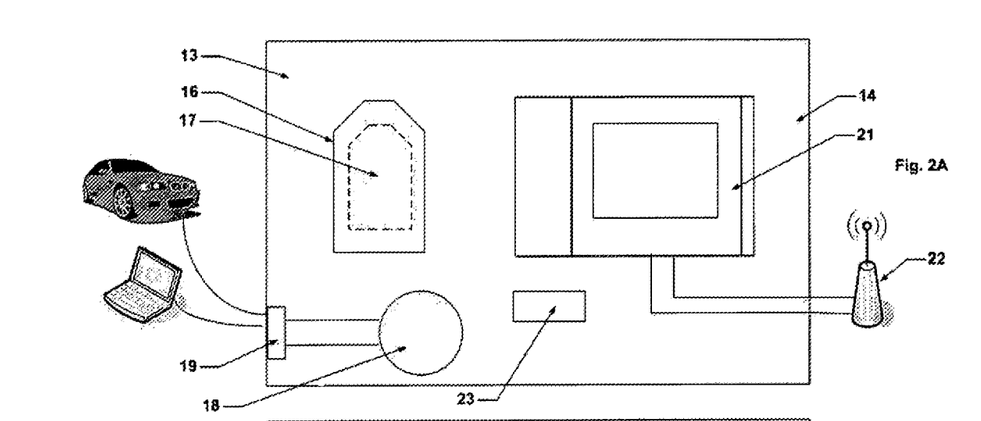
FIG. 2A is a schematic plan view of a front face of a printed circuit board of a tag used in the position identification system of FIG. 1.
Figure 2B:
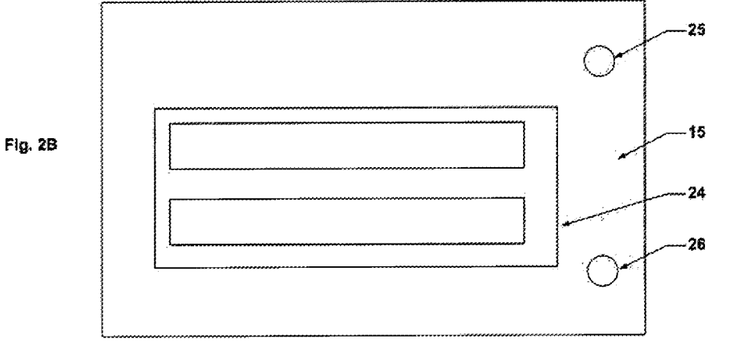
FIG. 2*b* is a schematic plan view of a rear face of the printed circuit board of the tag used in the position identification system of FIG. 1.

FIGS. 2A and 2B schematically illustrate an embodiment of the tag 12.

The tag 12 comprises a printed circuit board (PCB) 13 with a first PCB face 14 (see FIG. 2A) and a second PCB face 15 (see FIG. 2B) which are opposed.

The first PCB face 14 includes a subscriber identity module (SIM) card slot 16 into which a SIM card 17 can be inserted. The SIM card slot 16 secures the SIM card 17 in place for operation. The SIM card 17 also stores various other information, such as the service-subscriber key (IMSI) and contact telephone number for example, as is well known. The use of SIM cards is well known to persons skilled in the art and need not be described in any further detail herein.

The PCB 13 also incorporates a battery 18 or other suitable power source for providing power for operation of the tag 12, and a charging socket 19 arranged for coupling a charging device to the battery 18. In a preferred embodiment the charging socket 19 may take the form of a mini AB/micro AB/universal serial bus (USB) interface which enables the battery 18 to be coupled to an external power source 20 such as a laptop, or dc-power supply in a vehicle, etc. so that the battery 18 can be recharged as required. The charging socket 19 (mini AB/micro AB/USB interface) is also operable to facilitate updating of firmware on the wireless module using a software application that may be specifically developed for the position identification device. In an alternative embodiment, the battery can be a non-rechargeable battery or other suitable power source. In a further embodiment, applicable in situations where an animal is to be tracked, for example, or where the tag 12 is to be exposed to sunlight, the tag 12 also incorporates solar powered charging means to further sustain battery life/operation time. In further embodiments of the invention, other charging techniques and technologies may also or alternatively be used, such as induction charging.

A chip-set 21 is mounted on the PCB 13 and is coupled to an antenna 22, and a processor in the form of an embedded microcontroller 23 to provide the operation of the tag 12 as will be described in further detail below.

The communications chip-set 21 includes a radio frequency transceiver (not shown) and operates to perform the data communications for operation of the tag 12 using the radio frequency communications in accordance with GSM/3G/3.5G/4G (WiMAX/LTE) and CDMA protocols in the usual, known manner. In further embodiments, GPRS (General Packet Radio Service), third generation (3G) and fourth generation (4G) or LTE/WiMAX communication protocols are adopted.

The communications chip-set 21 also provides a means to perform such radio baseband functions as power management, signal amplification, signal filtering, frequency duplexing, advanced signal processing and data communication to the embedded microcontroller 23 and to the SIM card 17 and other wireless functions including Bluetooth™, Wi-Fi, WiMAX, ZigBee communication, and other digital processes.

The antenna 22 is operable to transmit and receive radio frequency (RF) communications signals to and from the radio network 2 which are coupled to the chip-set 21 in the usual, known manner. In a preferred embodiment, the antenna 22 can be in the form of a flexible strap that can be used to secure the tag 12 to the article 10—see FIG. 3. Using a helical based antenna wound as part of the attachment mechanism is advantageous as it increases antenna efficiency, signal sensitivity and reduces RF power consumption.

In the present embodiment, the microcontroller 23 is a commercially available microcontroller. The microcontroller 23 stores software and location information from the SIM card 17, and firmware pertinent to the operation and function of the tag 12 in any suitable manner known to persons skilled in the art. The microcontroller 23 is coupled to the communications chipset 21 by a hard wired connection (not shown) or any other suitable wired or wireless connection. In further embodiments, the communications chipset incorporates such protocols as GPRS (General Packet Radio Service), third generation (3G) and fourth generation (4G) protocols for communicating means.

A display 24 is provided on the second PCB face 15. In a preferred embodiment the display 24 is an e-paper or liquid crystal display (LCD) and is operable to display, via a user interface, article identification information such as the user name and arrival destination and user contact flight number—as illustrated schematically in FIG. 4.

Figure 4:
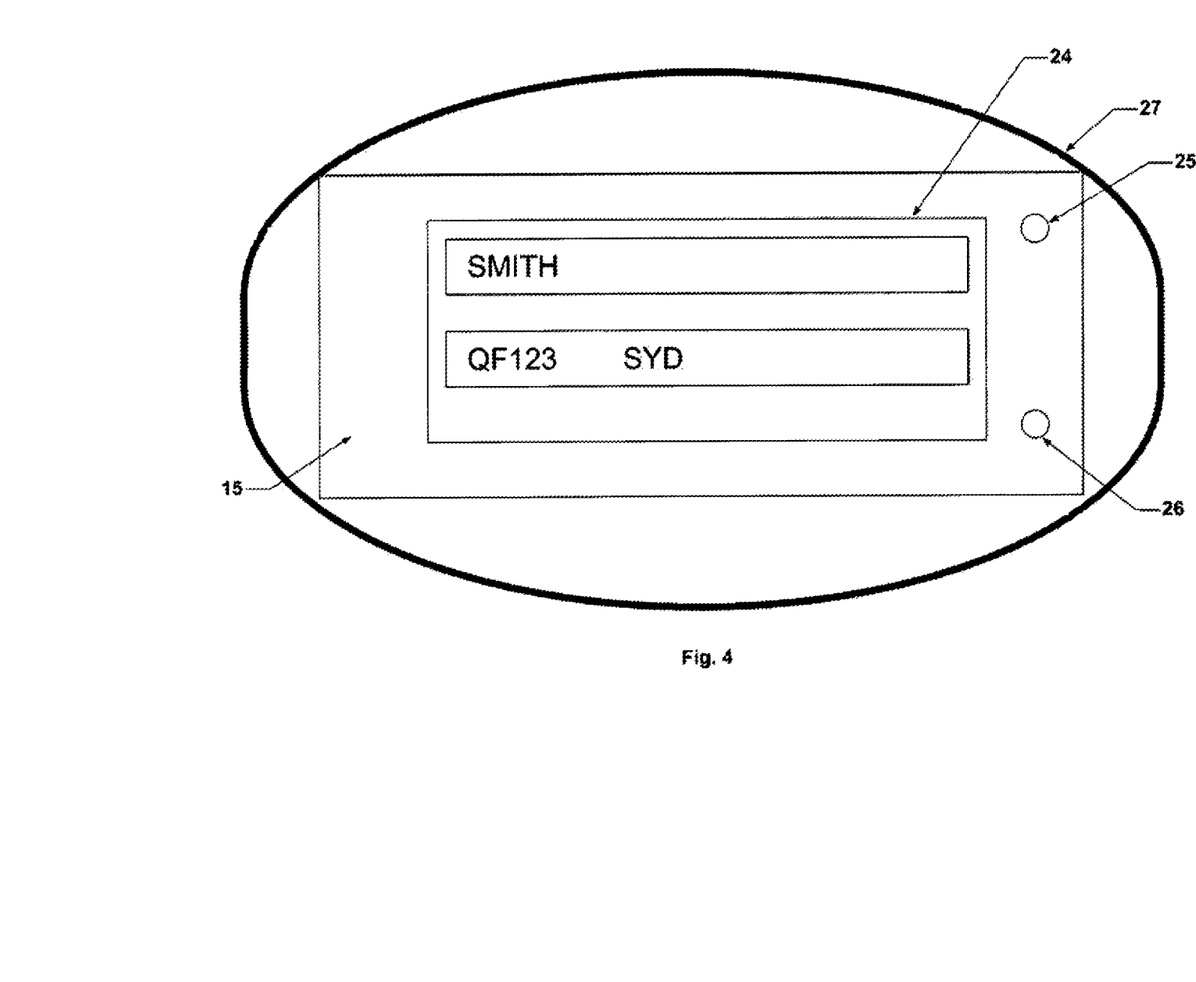
FIG. 4 is a schematic illustration of a display on the tag used in the position identification system of FIG. 1.

This information is uploaded to the microcontroller 23 by the user using the central server system 11 as will be described in further detail below. Once uploaded to the tag 12, this information can be displayed on the display 24 as shown in FIG. 4. Thus, the tag 12 acts as a luggage label which enables anyone who finds the article 10 to contact the user. Other information or data may also be displayed, such as a battery indicator indicating an amount of charge of the battery 18 and/or an indicator showing successful connection to cellular network, for example.

The second PCB face 15 also further comprises an alert means or indicator in the form of a light emitting diode (LED) 25, visible on both sides (i.e. the first PCB face 14 and the second PCB face 15) of the PCB 13, and a sensor or detector in the form of a light sensor 26, operable on both sides (i.e. the first PCB face 14 and the second PCB face 15) of the PCB 13. The light sensor 26 is mounted horizontally with a light pathway from either side of the tag 12. In alternative embodiments of the invention, light pathways may be provided on both sides of the PCB 13.

The LED 25 is operable to indicate the status of the article 10. In this embodiment, the LED 25 is operable to illuminate if the article 10 is determined to be missing.

The tag 12 is arranged to switch between a first, a second and a third mode, state or method of operation—a "reception" or "normal mode (receive and transmit radio data)", a "disabled/lock off" or "minimum or minimal functionality mode (no reception or transmission of radio data)" and an "alarm or alert mode (receive and transmit data, the LCD of the display means 24 activated and the LED illuminated)", respectively.

In the minimum functionality mode, the tag 12 is disabled from wireless communication via the antenna 22 and is placed into minimum functionality mode turning off all non essential electronic circuits to conserve battery life. When the article 10 is travelling by airplane, for example, wireless RF communication devices may interfere with the navigation systems of the airplane, and it is therefore imperative that the tag 12 does not use RF communications at this time. When in the cargo hold of an airplane it may be necessary to make sure that the tag 12 is in minimum functionality. A further benefit of switching the tag to the minimum functionality mode, is that when in storage compartment it serves to conserve battery power. In a further, fourth mode of operation—"flight" or "travel" mode the tag 12 can be set by a user to operate in the hereinbefore described minimal functionality mode for a period of time. The period of time may be predetermined or prescribed.

When the tag 12 is in normal functionality mode it is operable to send and receive data and respond to any location requests via the position identification system 1 as described in further detail below.

Switching between the minimum functionality mode and normal mode is activated by means of the sensor 26.

In one embodiment, the sensor 26 includes a light sensitive resistor which is operable to determine when ambient light in the vicinity of the tag 12 falls below a predetermined threshold and, at such time, the sensor 26 is operable to switch the tag 12 to the minimum functionality mode. The sensor 26 generates and sends a signal to the microcontroller 23 to place all non-essential electronic components of the tag 12 into a low power mode and to disable the RF communication on the GSM Controller which is incorporated into the communication chip-set 21. To reduce the risk of fire, aircraft cargo holds are not lit after the cargo hold doors are closed so in this way, when the surrounding environment goes dark, the tag 12 is switched to the minimum functionality mode. In an embodiment of the invention, the tag 12 is operable to automatically "wake up" and enter the reception or normal mode of operation once a condition or event is satisfied, such as once every 24 hours after first detection of light, irrespective of light conditions, for example. Such operation advantageously allows for location of tagged articles (such as bags) that have been permanently stored in a dark location.

In should be appreciated that the invention is not limited to the indicator and sensor described, and in alternative embodiments the property identification device may comprise a plurality or set of indicators operable to provide an indication of a plurality of events or conditions. Additionally, or alternatively, the property identification device can comprise a plurality or set of sensors or detectors operable to sense and gather sensor data or information relating to properties (property identification data) and parameters of and/or associated with the property identification device, the article, and/or the property identification system additional to or instead of position identification data, and to communicate the detected sensor data to a processor of the property identification device (such as the microcontroller 23) and/or another device, such as the central server system 11, for processing. On the basis of the processing of the received sensor data, the processor (under control of software) is operable to determine or identify the property and/or whether an event or condition has occurred and control operation of components of the property identification system accordingly to initiate an action corresponding to the determined event or condition. The initiated action may comprise, for example, activating an appropriate indicator, or changing the state or mode of operation of the property identification device and/or another component of the property identification system from one state to another state.

The abovementioned processing of the data undertaken by the relevant processor may be controlled by an analytical software application operable to determine on the basis of the data whether a prescribed event or circumstance has occurred (such as a temperature exceeded or deviation of an article or item from a prescribed path) and to control components of the position identification system 1 accordingly to initiate appropriate action(s).

In one embodiment, a sensor is provided that includes a mechanism to detect fluctuation of wireless signal strength and neighboring cellular information (i.e. radio frequency (RF) signal strength changes or fluctuations) and from this data the microcontroller 23 is operable to determine whether the tag 12 is, for example, moving constantly at selected speeds, accelerating or stationary, and to control the state or mode of operation of the tag 12 accordingly—i.e. to automatically switch from one state or mode to another. Such a sensor operation advantageously allows for the tag 12 to be switched to the minimum functionality mode when motion is detected (i.e. when an aircraft, for example, is in taxi, takeoff or landing operations as a moving aircraft will be subject to changing RF signal strength as it moves towards, away from, or across an RF signal source) and switched to the normal mode when no motion is detected (i.e. the RF signal strength is constant rather than changing). Accordingly, changes in wireless signal strength are used to determine if the position identification device is moving or stationary and switched on/off accordingly.

In further embodiments of the invention, the set of sensors include temperature sensors or thermometers so that, in addition to or instead of location data, temperature information or data (or other properties or storage parameters) can be sensed and communicated, either on request or automatically if set parameters are breached/exceeded, and identified and appropriate action initiated by the processor based on the temperature information. Temperature sensitive goods including pharmaceutical agents, human tissue and vaccines as well as other commodities such as meat and fish requiring transportation under strict temperature controls could be monitored during transportation by a property identification device of the invention having such a sensor and if set parameters are breached the property identification system operable to determine the occurrence of the same and act appropriately, such as generating and delivering an information communication in the form of an SMS, email or website alarm to a communication device of an owner of the goods—thereby enabling remedial action to be taken before the goods are spoiled. The information delivered via the communication may include the actual temperature of goods in transit, in addition to their actual position or location if such property is also being sensed.

Pressure and proximity sensors and other telemetry sensors may also be used to gather data and information in alternative embodiments of the invention. In an alternative embodiment, the tag 12 (or indeed a plurality of tags 12) could be simultaneously switched to the minimum functionality mode using a remote device (not shown), for example, using wireless communication.

Figure 3:
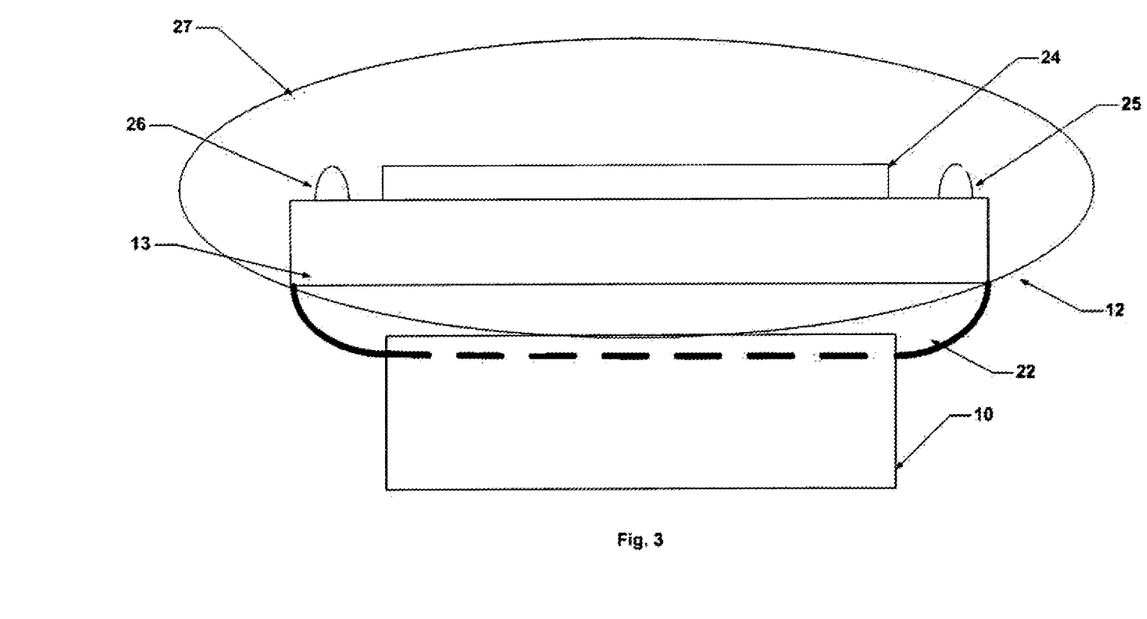
FIG. 3 is a schematic cross-section of the tag used in the position identification system of FIG. 1 and attached to an article.

In a preferred embodiment the tag 12 will be encased in a robust housing 27. The robust housing 27 can be of any suitable type and configuration. It should be made to be able to withstand extreme weather conditions that it may encounter allowing the tag 12 to operate correctly when in those conditions.

In a preferred embodiment of the tag 12, the housing 27 may be in the form of a convex-shaped housing with a transparent window so that the display means 24 is visible through the housing window and there is a light pathway to the light sensor 26. The housing 27 has a convex-shaped profile to ensure that tag 12 cannot be pushed flat against the surface of a suitcase or other surfaces which might prevent light getting to the sensor means 26, which might inadvertently cause the tag 12 to switch to the minimum functionality mode. Alternatively, the sensor 26 may have light pathways from either side of the tag 12.

In an integrated embodiment of the tag 1, the SIM card 17 and the microcontroller 23 are built inside the tag 12, so are not visible to the user. Other than these features the integrated embodiment of the tag 12 is as previously described.

The tag 12 is in communication with the central server system 11 via a cellular radio telephone network 2, which in this embodiment is a GSM network.

The central server system 11 comprises a CTI (Computer Telephony Integration)/IVR (Interactive Voice Response) server 40, a call manager server/PSTN gateway 41, a database server 42, a web server 43, a user directory server 44 and an SMS (Short Message Service) application server 45. CTI and IVR servers—which provide computer telephony integration and voice response to callers—are well known to persons skilled in the art and need not be described in any further detail herein.

The central server system 11 is illustrated schematically in FIG. 1.

The call manager server 41 is operable to receive calls from users of the position identification system 1 via fixed line telephones 48, and/or cellular radio telephones 47.

The database server 42 is arranged for data communication with external third party databases 49, for example, hosted by an airline, airport operator or travel company. The data communication can be implemented in any suitable known way, for example via a wide area network such as the Internet or a local area network.

The web server is arranged to provide web-based access to users of the position identification system 1 via the Internet 51 from remote terminals 50 comprising communication devices such as computers, personal digital assistants, internet-enabled cellular radio telephones and such.

The user directory server 44 is used to store account details of users of the position identification device, including such details as name, passwords, Personal Identification Number, and serial numbers The CTI/IVR server 40, the call manager server 41, the database server 42, web server 43, and user directory server 44 are all in database communication with the SMS application server 45.

The SMS application server 45 enables communication with the tag 12 as will be described in further detail below and provides for the functionality of the position identification system 1 at the central server system 11.

The SMS application server 45 is in data communication with an SMS service center 46 provided as part of the cellular radio telephone network 2 by the network operator. The operation of SMS service centers and the operation of SMS services are well known to persons skilled in the art and need not be described in any further detail herein. When the tag 12 is in the minimum functionality mode of operation messages are stored on the SMS application server 45 and re-sent at regular time intervals until expiry of a prescribed or selected time period. In this manner, once the tag 12 changes from minimal functionality mode to reception or normal mode the massage will finally be delivered.

A user is allocated a tag 12 for use in tracking the position of the article 10 to which it is securely attached.

This can be done using one of the remote terminals 50 via the Internet 51 and the web server 43. Alternatively, this may also be done via telephone 47, 48 using the interactive voice response (IVR)/computer telephony integration (CTI) server 40 or via the call manager server 41 in any suitable known way. The information is then stored on the database server 42. Alternatively this may be done via cellular telephone 47 using a central SMS number. It is the database server 42 that stores this information.

Third party service providers such as airlines may provide a means to upload travel details to the database server 42 from third party database server 49.

In a further embodiment data may also be inputted by way of Bluetooth™, Wi-Fi, WiMAX, ZigBee communication or some other wireless means.

The SMS application server 45 is then operable to upload the article identification data to the microcontroller 23 and the tag 12 for display on the LED display 24. This article identification data comprises information about the user and may include, for example, the user's contact details and intended destination of the article 10 as mentioned above.

Before transit, the tag 12 is placed in the normal mode as described above.

The SMS application server 45 sends specific commands to the communications chip-set 21 to place the tag in the normal mode.

Once the article 10 is in transit, the tag will remain in the normal mode until such time as it is loaded into a cargo hold of the airplane, or other such transport mode, where the tag 12 will switch to the minimum functionality mode in response to the sensor means 26 detecting that the lights in the cargo hold are switched off.

In another embodiment of the invention the plurality of tags 12 may be temporarily switched off by central remote control as discussed above. This mechanism disables both radio functionality and puts the tag 12 into minimal operating mode and overrides all other operating modes of the device.

If the article 10 arrives at its destination, then the user can switch off the tag 12 through the central server system 11 or other appropriate means when the user takes possession of the article 10.

The user can program multiple flight information (multiple itineraries) into the database server 42. Therefore a multi flight journey can be programmed into the database server 42 and transmitted to the position location device 12 after each individual flight via the application server 45 to the tag microcontroller 23. This new destination information is then up-loaded to the LCD screen of the display means 24.

If the article 10 does not arrive at its intended destination, then the user will be advised of its destination, as follows.

Location of the article 10 can be determined by contacting the tag 12 to respond with its location. The user can manually activate alert mode upon request. Following this the tag 12 will activate its alert means 25 and activate the LED to illuminate as described above. This mechanism will allow baggage handlers or the user for example to identify luggage quickly.

When a user wishes to query the location of the article 10, the user calls the central server system 11 in the usual way and as described above in respect of the uploading of information to the tag 12.

In response to a user request for the location of the tag 12, the SMS application server 45 is operable to poll a unique mobile subscriber integrated services digital network (MSISDN) number allocated to the SIM card 17.

The SMS application server 45 sends a query to the position identification device using the MSISDN number to extract the location information from the SIM card 17.

The details of the MSISDN are stored in the database server 42 and are retrieved by the SMS application server 45 from the database server 42 to poll the SIM card 17.

The SMS application server 45 sends a command string using standard SMS format to the position identification device in order to poll the information on the SIM card 17 and microcontroller 23.

On receiving the location request i.e. the poll from the SMS application server 45, the tag 12 is operable to poll the nearest operable base transceiver station (not shown) within the cellular radio network 2 to determine the location area identifier (LAI) and cellular identifier (CellID) for the SIM card's location and to store it in the SIM 22 and the microcontroller 23. The use of the LAI and CellID to determine the location in which a SIM card 17 is located is well known to persons skilled in the art and need not be described in any further detail herein.

Under control of software built into the microcontroller 23, the tag 12 is operable to send an SMS status message to the SMS application server 45 containing the LAI and CellID information. The SMS application server 45 is then operable to map the LAI and CellID against specific destination information, such as the nearest airport or specific airport terminal, stored in the database server 42 thus determining a specific location for the article 10.

The described embodiment of the position identification device determines its location based on strongest received signal strength indication (RSSI) (being the closest BTS station to the airport). The central server system 11 includes a database for storing data on local area identifiers and corresponding location information, and the central server system 11 is operable to determine the location information from the local area identifier. Alternatively the central server system database may also store data from the position identification devices and users associated thereto.

The SMS application server 45 is then operable to create an SMS message, email or IVR to include details of the location as previously determined, which is then sent to the user who initiated the location request i.e. the user. This SMS message is sent to the user who will then be able to know where the article 10 is located.

In another embodiment, the SMS application server 45 can be operable to send an email in addition or instead of with the required information. User emails, addresses and cellular radio telephone numbers are all stored on the database server 42.

At the same time, the microcontroller 23 is operable to send a signal to the LED 25 to cause it to illuminate as described above.

In the second embodiment of the invention, the tag 12 is operable to automatically initiate a check on its position and compare it to the intended destination, rather than waiting for a location request from the central server system 11.

In this instance, when the position identification device is removed from the hold of an aircraft and automatically switches to normal mode, the microcontroller 23 and the communications chip-set 21 is operable to determine the LAI and CellID and to send an SMS status message to the SMS application server 45 as before. The SMS application server 45 is then operable to determine the location as described above and to compare it (the determined actual location) with the expected/desired destination (which will have been uploaded by the user initially and will be stored on the database server 42). If the two do not match, the position identification system 1 is operable to alert the user of the actual position of the tag 12 (and therefore of the article 10 to which it is connected) in the same way as before. In addition, the alert means 25 is activated to indicate to people in the vicinity of the article 10—such as airline and baggage handling staff—that the article 10 is missing/not at its intended destination.

Each tag 12 will also have a unique IMEI/IMSI number in the same way as all GSM mobile devices. This can be represented as a barcode on the device. This can be scanned by airlines or other third parties and compared with known databases that store this data. This can also assist in locating owners of lost articles or for inventory information as the IMEI is linked to GSM operator databases, mobile manufacturers and retailers.

In another embodiment of the invention, the tag 12 can include GPS capabilities to determine location by means of GPS data. This can then be sent in the SMS status message to the SMS application server 45 and used appropriately.

If the SMS card 17 is removed from the tag, then the tag 12 is unusable.

Figure 5A:
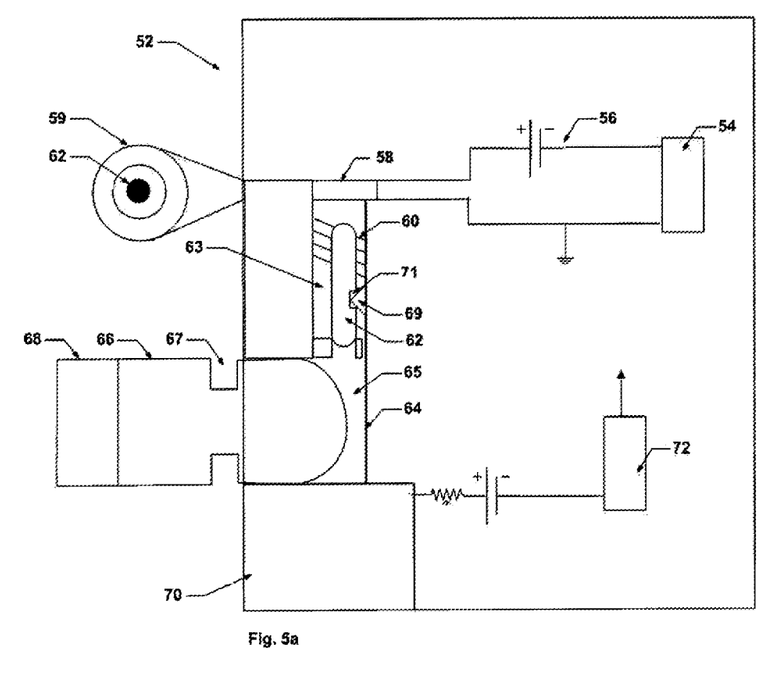
FIG. 5*a* is a schematic illustration of securing means used to attach the tag to an article in an unlocked position.
Figure 5B:
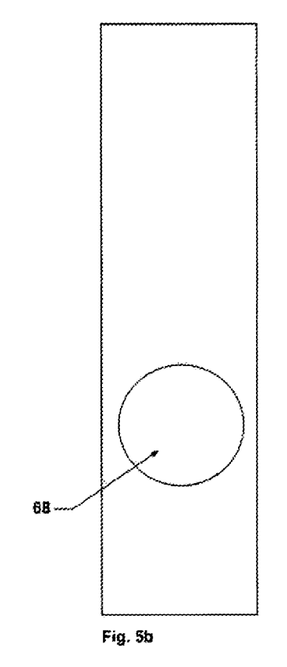
FIG. 5*b* is a schematic illustration of a side on view of the securing means of FIG. 5*a*.
Figure 6:
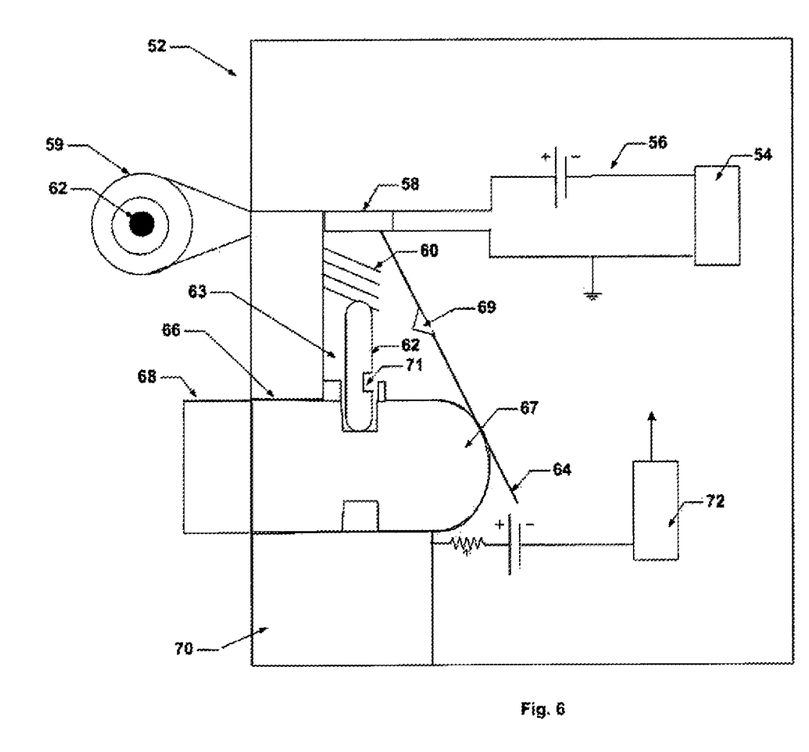
FIG. 6 is a schematic illustration of the securing means of FIG. 5*a* in a locked position.

In an advantageous embodiment of the invention, the tag 12 incorporates a lock in the form of a mechanical barrel lock or an electro mechanical securing means or fastener 52 for attaching the tag 12 to the article 10, illustrated in FIGS. 5a, 5b, and 6 of the drawings. Alternative embodiments of the lock can be used independently of the tag 12, for performing a locking/securing/attaching function in other applications.

The fastener 52 comprises a first processor which in this embodiment is in the form of a lock microcontroller 54 operably connected to an actuator in the form of an electromagnetic driver circuit 56 operably connected to a ferrite core 58 having a coil 59. The microcontroller 54 is in communication with the communications chip-set 21 of the tag 12, such that instruction messages received by the communications chip-set 21 by way of SMS can be processed by the lock microcontroller 54. If the communications chip-set 21 receives an SMS instruction message containing an "unlock" password, such as the user's personal identification number, it will be processed by the microcontroller 54 as an unlock code to unlock or disengage the fastener 52 as further described below.

The microcontroller 54 may be a separate microcontroller. In a preferred embodiment, the fastener 52 uses the existing microcontroller 23 of the tag 12.

The electromagnetic driver circuit 56 is operable to receive operating instructions from the microcontroller 54 and to relay these to the ferrite core 58 and coil 59 by way of electrical signals.

The ferrite core 58 is in contact with first biasing means or biaser which in this embodiment comprises a spring 60 operably coupled between the ferrite core 58 and first engagement means or engager in the form of a pin 62. The coil 59 is wound around the pin 62 and the ferrite core 58 to induce magnetism when the core 58 is energised. The pin 62 is slidably retained in a guide channel 63 extending from the ferrite core 58 and opening into a recess 65 provided in the housing 27 of the tag 12 and bounded by a support 70. The pin 62 is moveable between a first, unlocked, position in which it is completely retained within the guide channel 63, with the spring 60 compressed between the ferrite core 58 and the end of the pin 62 proximate thereto, and a second, locked, position in which the end of the pin 62 remote from the ferrite core 58 extends into the recess 65. In the second position, the spring 60 is uncompressed, i.e. is extended, between the ferrite core 58 and the end of the pin 62 proximate thereto.

A second engagement means or engager is provided in the form of a connector head 66 removeably receivable within the recess 65. The connector head 66 is moveable from a first, unlocked, position in which it is free to move within and exit the recess 65, and a second, locked, position, in which the end of the pin 62 remote from the ferrite core 58 extends into the recess 65 and a locking groove 67 of the connector head 66 to lockingly engage therewith.

The connector head 66 is operably connected to a wire cable 68, via which the tag 12 and fastener 52 can be attached to an article, and is bounded by the conductive support 70 when received in the recess 65. The conductive support 70 is further connected to a second processor. In a preferred embodiment the wire cable 68 incorporates an antenna such as the antenna 22 described in FIG. 2*a*.

A second biasing means or biaser comprising a leaf spring 64 is also provided, extending parallel along the guide channel 63 such that a moveable end thereof extends into the recess 65. The leaf spring 64 assists in retaining the pin 60 in place in its first position and preventing it from moving unintentionally into the second, locked, position. In this regard, the leaf spring 64 is moveable from a retaining position, in which a retaining projection 69 thereof is received within a retaining notch 71 of the pin 62 to hold the pin 62 once in the first, unlocked, position and an unretaining position in which the retaining projection 69 is removed from the retaining notch 71. Insertion of the connector head 66 into the recess 65 an operative distance causes it to abut the moveable end of the leaf spring 64, and move it from the retaining position to the unretaining position when inserted beyond the operative distance.

On receipt of an SMS instruction message containing an "unlock" password by the communications chip-set 21, the lock microcontroller 54 instructs the electromagnetic driver circuit 56 to energise the ferrite core 58 and coil 59. Energisation of the ferrite core 58 and coil 59 causes the pin 62 to be attracted thereto via induced magnetism, slidably moving it into the first position and compressing the spring 60. Energisation of the ferrite core 58 is time limited to conserve battery power.

In this position, the connector head 66 is moveable within the recess 65. Without the restraining pin 62 holding the connector head 66, the force of the leaf spring 64 is sufficient to cause the leaf spring 64 to straighten and push the connector head 66 retrograde in the recess 65, causing the projection 69 to locate into the retaining notch 71 and locking the restraining pin 62 in the open position with the spring 60 compressed. This action also allows the connector head 66 to be removed from the recess 65 and the tag 12 unsecured from/or secured to the article 10. As the connector head 66 is withdrawn from the recess 65 so that it no longer extends beyond the operative distance, the leaf spring 64 moves to a retaining position in which the retaining projection 69 thereof is received within the retaining notch 71 of the pin 62 to hold the pin 62 in the first, unlocked, position.

To lock the fastener 52, the wire cable 68 is looped around or through an appropriate portion of the article 10 (such as a handle thereof). The connector head 66 is inserted into the recess 65 beyond the operative distance such that the locking groove 67 aligns with the guide channel 63, and the moveable end of the leaf spring 64 is abutted and moved from the retaining position to the unretaining position. In this manner, the retaining projection 69 of the leaf spring 64 is withdrawn from the retaining notch 71 of the pin 62 and it is free to move from the first, unlocked, position to the locked position.

As the ferrite core 58 and coil 59 is not energised, the pin 62 is no longer attracted thereto, and the spring 60 expands to move the pin 62 to the second, locked, position. In this position, the end of the pin 62 remote from the ferrite core 58 extends into the recess 65 and locking groove 67 of the connector head 66 to lockingly engage therewith, and thereby secure the tag 12 to the article 10.

As described above, the conductive support 70 is operably connected to a second processor which in this embodiment is in the form of a microcontroller 72. In addition to providing a strong support around connector head 66, the conductive support 70 completes an electrical circuit connecting all components within the securing means 52. The microcontroller 72 is operably connected to the communications chip-set 21. If the microcontroller 72 detects that the wire cable 68 is broken or detached without proper instructions, or the circuit formed by the components is otherwise broken, it will instantly send instructions through to the communications chip-set 21 to send an SMS to the user or nominated authority with the position location of the tag 12 at that instant.

In a further embodiment, the connector head 66 may be under tension by another biasing means or biaser which may be a spring which is held in bias when in the locked position and further forces the connector head 66 when disengaged to retract and release the tag 12. The leaf spring 64 may also perform such a function if appropriately tensioned. In a further embodiment the second engagement means or element may be operably connected to the alert means 25, thus allowing an alert signal to the user to be generated once the fastener 52 is unlocked, prompting the user to retract the connector head 66.

In a further embodiment, the fastener 52 may also receive detachment instructions by way of Bluetooth, infrared or such wireless controls from a control unit it is in sync with.

In another embodiment of the lock, the microcontroller 54 is operable to process an SMS instruction message containing a "lock" password received by the communications chip-set 21 as a lock code instruction and lock the securing means.

Variations are possible within the scope of the present invention. For example, the tag 12 can determine its location using known triangulation techniques rather than determining the LAI, or other positioning methods, such as hybrid methods (including Assisted GPS); Time Difference of Arrival (TOA) methods; and/or Angle of Arrival (AoA) methods.

Furthermore, any suitable communication protocol can be used to facilitate communication between any subsystems or components of the position identification system 1, including wired and wireless and an SS7 (Signaling System 7) signaling channel, as are well known to persons skilled in the art and need not be described in any further detail herein.

The tracking and locating system and method of the described embodiment of the present invention is not limited to such tracking and locating, however. In alternative embodiments it may be used to track and locate any person, animal, freight, vehicle, parole prisoner, children and other moving or movable objects. These could all be tracked or located by use of alternative embodiments of the present invention.

As described previously, in embodiments of the invention the position identification device can be incorporated into the article itself and in one embodiment is built into a laptop computer or similar devices.

As also described, properties other than, or additional to, position and location may be identified in alternative embodiments of the invention.

It should be further appreciated by the person skilled in the art that variations and combinations of features described above, not being alternatives or substitutes, can be combined to form yet further embodiments falling within the intended scope of the invention. Modifications and variations such as would be apparent to a skilled addressee are deemed to be within the scope of the present invention.

The invention claimed is:

1. A system to provide a location of a device over a network, comprising:
   the device that is configured to perform one or more actions, including:
      employing conditions sensed by one or more sensors to operate in one or more of a plurality of modes; and
      employing a housing of the device to provide a light pathway to one or more of a display or a sensor; and
   a server that is configured to performs action, including:
      receiving data from the device, wherein the data includes position identification data;
      determining the location of the device based on the position identification data, wherein the device's location is accessible to a user of the system.

2. The system according to claim 1, wherein the server performs further actions including employing one or more triangulation methods to identify the location of the device, wherein the one or more methods include received signal strength indication (RSSI), global positioning system (GPS), assisted GPS, time difference of arrival (TQA), or angle of arrival (AoA).

3. The system according to claim 1, wherein the device communicates with the server over one or more networks, including Global System for Mobile communications (GSM), 3G, 3.5G, 4G, Long Term Evolution (LTE), or Worldwide Interoperability for Microwave Access (WiMax).

4. The system according to claim 1, wherein the housing of the device is convex-shaped to provide the light pathway.

5. The system according to claim 1, wherein the device is one or more of a personal computer, laptop computer, notebook computer, tablet computer, or a smartphone.

6. The system according to claim 1, wherein the device performs further actions including periodically providing the position identification data to the server.

7. The system according to claim 1, wherein the server is configured to perform further actions, including:
   comparing a current location of the device to an anticipated location of the device and, if they are different, to transmit the current location to the user.

8. The system according to claim 1, wherein the location of the device is communicated to the user via one or more of short message service protocols, email, dynamic map pin-pointing using a Geographic Information System, or Interactive Voice Response.

9. The system according to claim 1, wherein the device performs further actions, including:
   operating in a first mode in which the device receives and transmits data;
   operating in a second mode in which the device is disabled from receiving and transmitting data; and
   operating in a third mode in which the device provides one or more of usage details or an alert to the user.

10. The system according to claim 1, wherein the one or more sensors include a temperature sensor, global positioning sensor, a light sensor, a pressure sensor, a proximity sensor, or a motion sensor.

11. A device that provides its location over a network, wherein the device performs actions comprising:
    employing conditions sensed by one or more sensors to collect data and operate in one or more of a plurality of modes;
    employing a housing of the device to provide a light pathway to one or more of a display or a sensor; and
    providing data to a server, wherein the data includes position identification data that the server employs to determine the location, wherein the device's location is accessible to a user of the system.

12. The device according to claim 11, wherein the server performs further actions including employing one or more triangulation methods to identify the location of the device, wherein the one or more methods include received signal strength indication (RSSI), global positioning system (GPS), assisted GPS, time difference of arrival (TQA), or angle of arrival (AoA).

13. The device according to claim 11, wherein the device performs further actions including communicating with the server over one or more networks, including Global System for Mobile communications (GSM), 3G, 3.5G, 4G, Long Term Evolution (LTE), or Worldwide Interoperability for Microwave Access (WiMax).

14. The device according to claim 11, wherein the housing is convex-shaped to provide the light pathway.

15. The device according to claim 11, wherein the device is one or more of a personal computer, laptop computer, notebook computer, tablet computer, or a smartphone.

16. The device according to claim 11, wherein the server is configured to perform further actions, including:
    comparing a current location of the device to an anticipated location of the device and, if they are different, to transmit the current location to the user.

17. A method that provides a location of a device over a network, wherein the actions of the method are performed by the device comprising:

employing conditions sensed by one or more sensors to collect data and operate in one or more of a plurality of modes;

employing a housing of the device to provide a light pathway to one or more of a display or a sensor; and providing data to a server, wherein the data includes position identification data that the server employs to determine the location, wherein the device's location is accessible to a user of the system.

18. The method according to claim 17, wherein the server performs further actions including employing one or more triangulation methods to identify the location of the device, wherein the one or more methods include received signal strength indication (RSSI), global positioning system (GPS), assisted GPS, time difference of arrival (TQA), or angle of arrival (AoA).

19. The method according to claim 17, wherein the device performs further actions including communicating with the server over one or more networks, including Global System for Mobile communications (GSM), 3G, 3.5G, 4G, Long Term Evolution (LTE), or Worldwide Interoperability for Microwave Access (WiMax).

20. The method according to claim 17, wherein the housing is convex-shaped to provide the light pathway.

21. The method according to claim 17, wherein the device is one or more of a personal computer, laptop computer, notebook computer, tablet computer, or a smartphone.

22. The method according to claim 17, wherein the server is configured to perform further actions, including:

comparing a current location of the device to an anticipated location of the device and, if they are different, to transmit the current location to the user.

* * * * *